UNITED STATES PATENT OFFICE.

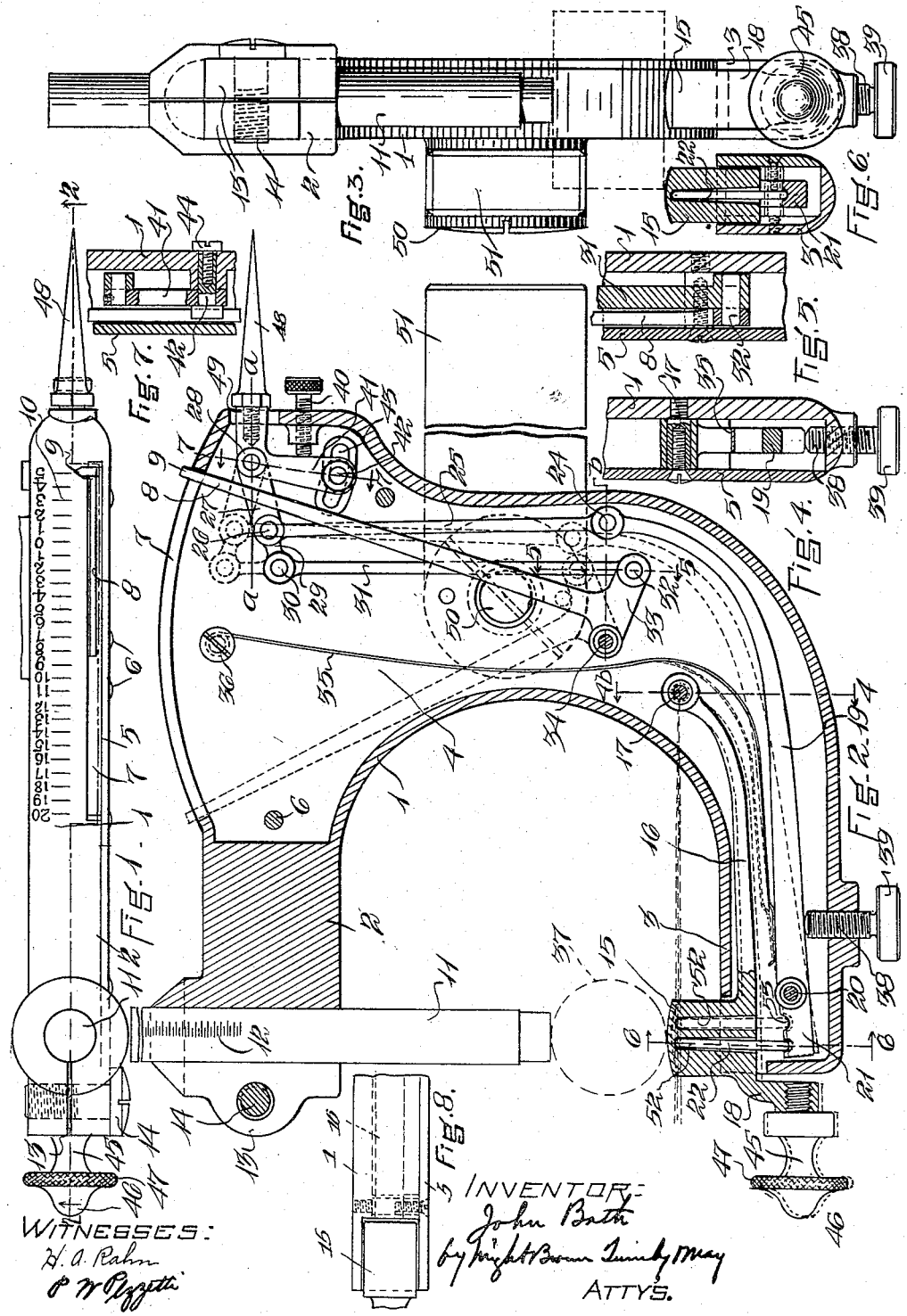

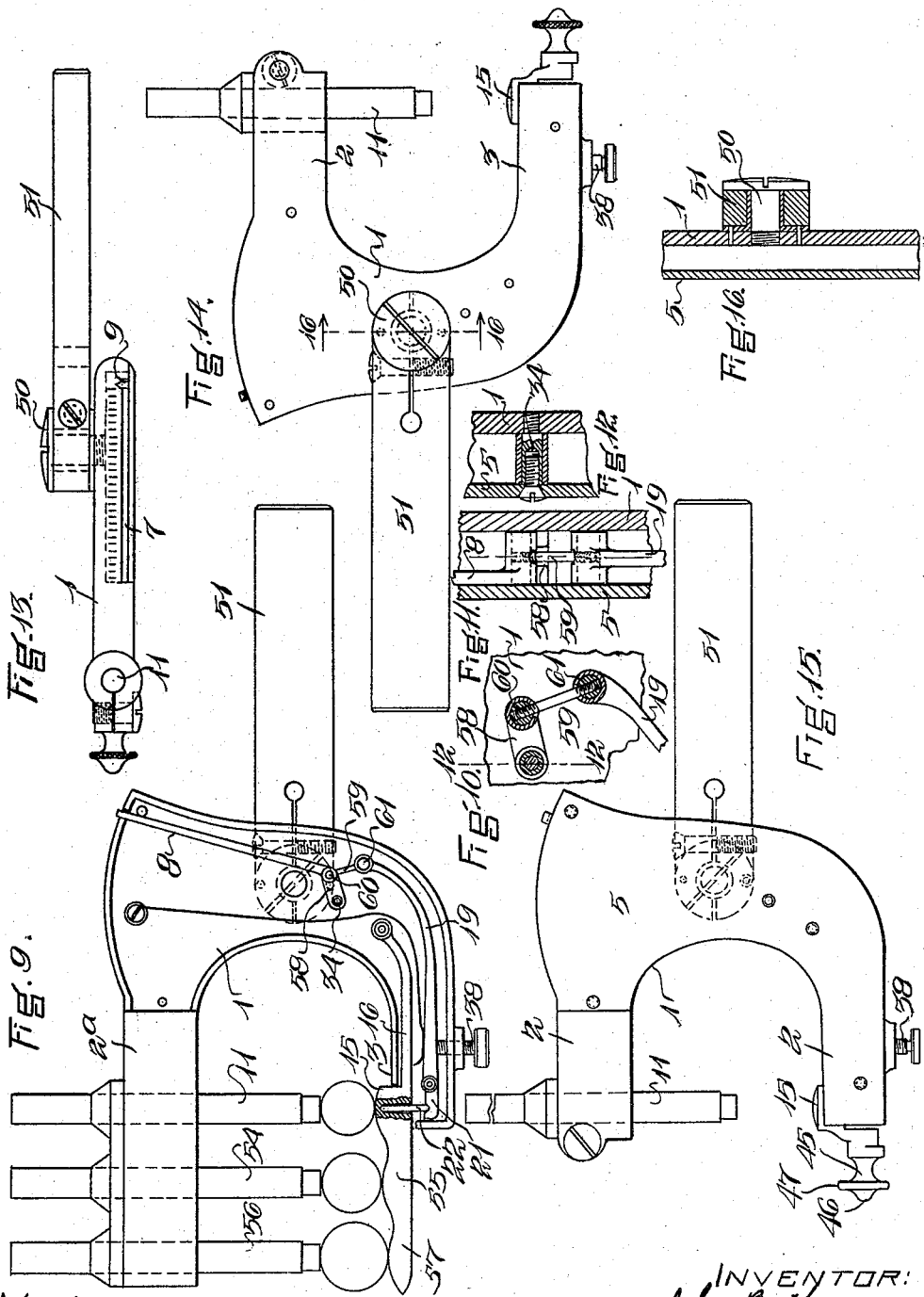

JOHN BATH, OF WORCESTER, MASSACHUSETTS, ASSIGNOR TO JOHN BATH & COMPANY, INCORPORATED, OF WORCESTER, MASSACHUSETTS, A CORPORATION OF MASSACHUSETTS.

MICROMETER-CALIPER.

1,202,019.   Specification of Letters Patent.   Patented Oct. 24, 1916.

Application filed September 8, 1914. Serial No. 860,540.

*To all whom it may concern:*

Be it known that I, JOHN BATH, a citizen of the United States, and resident of Worcester, in the county of Worcester and State of Massachusetts, have invented certain new and useful Improvements in Micrometer-Calipers, of which the following is a specification.

My invention relates to a micrometer caliper of the type in which the calipering points or jaws are able to move relatively apart or together against a yielding resistance, and in which there is an indicator operated thereby to show at once the dimension or the difference from a given dimension of the thing which acts upon the caliper points or jaws.

The general object of the invention is to provide an instrument or caliper of the sort indicated which shall be capable of measuring the dimensions of an article, whether the same is stationary or is revolving in or with the work holder of a machine tool, and to detect and indicate the amount of eccentricity or other error in a piece having a curved or a plane surface.

More specifically my object is to embody in an instrument of the character indicated having the capacity for operation as indicated above, the features of construction and arrangement of the several operating parts by which errors in the operation of the instrument are eliminated and the dimensions and distances measured by the instrument may be many times multiplied at the indicating point with extreme accuracy.

In carrying the foregoing objects into practical effect I have produced an instrument of which various forms and embodiments are illustrated in the accompanying drawings, to which reference is made in connection with the following description for a complete and detailed explanation of the principles of my invention and a possible mode of application of such principles in an operative device.

Referring to the drawings, Figure 1 represents a plan view of an instrument embodying my invention. Fig. 2 is a vertical sectional view of the instrument taken on line 2—2 of Fig. 1. Fig. 3 is an end view of the instrument as seen from the left of Figs. 1 and 2. Fig. 4 is a sectional view of a detail of the instrument taken on line 4—4 of Fig. 2. Fig. 5 is another detail sectional view taken on line 5—5 of Fig. 2. Fig. 6 is another sectional detail view taken on line 6—6 of Fig. 2. Fig. 7 is a sectional detail view taken on line 7—7 of Fig. 2. Fig. 8 is a plan view of one of the movable calipering points or jaws of the instrument shown in connection with the adjacent part of the frame of the instrument. Fig. 9 is a side elevation of a modified form of the instrument embodying the same principles as that shown in the previous figures but containing certain alterations and additions in its construction, said Fig. 9 representing the instrument with one of the faces of its inclosing casing removed. Fig. 10 is an elevation partly in section on an enlarged scale of a detail of the instrument shown in Fig. 9. Fig. 11 is an elevation of the mechanism shown in Fig. 10 as viewed from the right of said figure. Fig. 12 is a sectional view on line 12—12 of Fig. 10. Figs. 13, 14, and 15 are views showing on a smaller scale the external appearance of an embodiment of the instrument substantially identical with that shown in Figs. 1 and 2 lacking certain of the details of such form of the instrument, Fig. 13 being a plan view and Figs. 14 and 15 elevations of opposite faces, respectively, of such instrument. Fig. 16 is a sectional view on line 16—16 of Fig. 14.

The same reference characters indicate the same parts in all the figures.

Referring first to Figs. 1 to 8 inclusive, which show in complete detail a practical and desirable embodiment of my invention, 1 represents the frame or body of the caliper instrument, which frame or body is substantially U-shaped having arms 2 and 3 extending in approximately the same direction and separated by a space of sufficient width to receive the article to be measured. A portion of the frame or body 1 is recessed to form a chamber 4 in which the moving parts or mechanism which transmit motion to the indicating element are located. This chamber is normally closed by a detachable cover plate 5 (shown in Fig. 1) which is attached to the body by screws 6 and conforms at its edges to the outline of such body. Between the body and the cover at the edge or side which, for the purpose of description may be called the top side or edge is left a slot 7 through which projects the end of an arm 8 carrying an indicator or pointer 9 which acts in connection with a scale 10 when moved by the calipering points or jaws as hereinafter described. The arm 2 has a passage in which is contained a bar or rod 11, the latter constituting one of the members which may be called for convenience of description the calipering abutments or points of the instrument. The said abutment 11 is shown conveniently as a rod which is adjustable endwise in the passage in the arm 2, and which is provided with graduations 12 for indicating in connection with an index or guide on the arm 2, the position of adjustment of said abutment. The arm 2 is formed with a slot 13 leading from its outer end into the passage containing the bar 11, and the ears formed by such slot are pulled together by a screw 14 to clamp the abutment bar 11 and secure the adjustments thereof.

Any desired form of caliper abutment may be used in place of the bar 11, with any desired means for adjusting it, or if desired, without provision for any adjustment whatever. My invention is concerned particularly with other features of the instrument than the abutment 11, and provided there is some element answering the purposes and serving the functions of the abutment 11, it is immaterial how such abutment is formed or arranged and whether or not it is adjustable. Any of the adjustable caliper jaws used at the present time in micrometer calipers, and any of the mechanisms and means for adjusting the same may be substituted for the bar 11 and the means for adjusting the same here shown. The caliper abutment or jaw 15 complemental to the abutment 11 extends toward the latter from the arm 3 of the body, being carried by lever 16 pivoted to a stud 17, the entire lever except the projecting abutment 15 and a short arm 18, presently to be described, being contained within the arm 3 of the frame. A second lever 19 is pivoted to a stud 20 and is formed with a short arm 21 which bears against one end of a thrust rod 22, the opposite end of which presses against a portion of the abutment 15. The long arm of lever 19 is jointed by a pivot 24 to a link 25 which is connected by pivot 26 to a lever 27. Said lever 27 is pivoted on a pivot stud 28 and has an arm 29 connected by a pivot 30 to a link 31, which in turn is joined by a pivot stud 32 with the short arm 33 of a bell crank lever pivoted at 34, the long arm of said bell crank lever being the arm 8, previously described, which carries the index or pointer 9. All the levers, links, and pivots above described are contained within the body or casing 1 and are normally concealed by the cover 5 thereof. A spring 35, which is a long strip, wire, or rod of sufficient elasticity and resilience is fastened at one end to an abutment stud 36 and its other end is arranged to bear on the lever 19, tending constantly to hold said lever and the parts associated therewith in the positions shown by full lines in Fig. 1, and to restore said parts to such positions after any displacement thereof from such positions when the force tending to cause displacement is removed.

When an article to be measured is passed between the abutments 11 and 15, as shown by the broken circle 37 in Fig. 1, it shifts the abutment 15, if its diameter or thickness is greater than the distance between said abutments. Pressure is then transmitted from the thrust rod to the arm 21 of lever 19, depressing the short arm 21 and raising the long arm of said lever, thereby raising the link 25, lever 27, link 31 and lever arm 33, and swinging the index arm 8 and index 9 from right to left across the graduations and figures of the scale 10. The extreme limit of movement of the various parts is indicated by the positions of such parts shown by the dotted lines in Fig. 1. By comparing the distance between the full and dotted line positions of the abutment 15 with the distance between the coresponding positions of the index arm, it will be seen that the movement of the caliper abutment is many times multiplied at the indicating point. In the instrument designed as here illustrated the multiplication is approximately one hundred times.

I have provided an adjustable stop 38 to limit the movement of return from the displaced position of the indicating linkage. Said stop is conveniently screw threaded through a wall of the casing into proximity with the long arm of lever 19, and having an external head 39 for actuation by the thumb and fingers of the user. Another stop 40 for the same purpose and being of substantially the same type and construction is provided to act in connection with the lever 27, being arranged adjacent to an arm 41 of said lever which projects downwardly from the pivot or fulcrum 28. Said arm 41 carries a stud 42 which projects through a slot 43 in the side of the casing or frame and is provided with a clamping screw 44, (Fig. 7) which is employed for clamping the lever whenever it is desired to prevent movement of the index. Either stop 39 or 40 is useful for first setting the index at the point on the scale which shows the size to which a piece of work is to be brought by having material removed from its surface. As long as the article remains of larger size than the desired dimension, it moves the index whenever placed between the caliper abutments, thus affording a qualitative means for indicating the excess of its dimension over the required dimension, and the approximate amount of such excess, in a much more rapid way than would be possible if it were necessary for the workman, each time he measured the work, to search for the graduation representing the final size and determine whether the graduation beside the index when the caliper is engaged with the work is of greater value than the required size. That is, the stops 38 and 40 are means for economizing time in use of the instrument, to mention one of their uses, and are valuable on that account.

Connected with the arm or lug 18 is a projection 45, Fig. 2, having a boss 46 and a rim 47, either of which may be brought up against a rotating or otherwise traveling work piece to determine the character and amount of eccentricity, or deviation from a plane, respectively, of the surface of such piece. A deviation from absolute truth of any point of such surface will displace the projection 45, and by acting through the linkage mechanism already described, displace the index 9. A similar service is performed by a pointed projection 48 which is connected to an arm 49 of the lever 27 and may be used as a surface gage.

This instrument is adapted to be used either as a hand tool or as an attachment on a machine tool. For the purpose of the latter use it is provided with a stud 50 (Figs. 3, 13 and 14) on one side of the frame, which forms the pivot or swivel for a shank or bar 51 which is adapted to be secured in the tool post or some other convenient part of a machine tool, whereby the caliper can be adjusted at the proper location and may be moved to bring its measuring abutments over the work in the machine.

I will now refer to features of the instrument which give it the quality of extreme accuracy which is desirable for a practical micrometer instrument. In the first place the caliper abutment 15 is located at so great a distance from the pivot 17 of the lever by which it is carried, that the movement of any point on the contact surface of said abutment within the short path to which its movement is limited is so nearly in a straight line that the deviation of such path from a straight line is incapable of measurement, wherefore it may be said that to all intents and purposes the abutment 15 moves in a straight line toward and from the abutment 11. Again the abutment 15 projects from the frame arm 3 a sufficient distance to permit of the practical use of the instrument, and the lever 16 is curved or bent upwardly to its fulcrum end to enable the fulcrum 17 to be placed in a certain definite position, as presently described. Another feature resides in the position and arrangement of the thrust rod 22. This rod is contained interchangeably in either of two or more recesses 52 in the under side of the abutment 15, and sockets or notches 53 in the lever arm 21. The ends of the thrust rod are preferably formed with pointed or knife edged bearings against the abutment and lever arm, respectively, although they may be otherwise formed, as with rounded ends, without departing from the spirit of the invention. For example, the upper end of the rod, which is acted on by the abutment, may be rounded, for this end of the rod has practically no displacement laterally during its full range of movement, while the lower end of the rod, which bears on the short oscillating lever arm 21 has a pointed or knife edge bearing, as shown in Fig. 2. The rod is also made as long as possible, and therefore its upper end is seated close to the outer limit of the abutment 15, so that there will be no appreciable change in the direction of the rod and of the line of thrust thereof on the lever arm 21 due to such slight divergence as exists between the arc of movement of the bearing point on such arm and the tangent to such arc. Then the fulcrum 17 and the fulcrum 20 are so located with respect to the rod 22 that a line from the center of fulcrum 17 through the middle point in the travel of the center of curvature of the upper end of the rod 22 (or of the bearing point of such end when the bearing is a knife edge or pointed bearing) is exactly perpendicular to the mid-position of the rod. Similarly a line drawn from the center of the fulcrum 20 through the mid point in the movement of the lower bearing end of the thrust rod (or of the center of curvature of such end when the latter is spherically or cylindrically curved), is perpendicular to the rod. The lines thus described as drawn from the centers of the fulcrums 17 and 20 are parallel to each other. The condition above described may be stated in another way by saying that the range of movement of the contact points of the rod 22 on the abutment 15 and on the lever arm 21, respectively, (or of the centers of curvature of the bearing of such rods, when such bearings are curved surfaces) extend equal distances to opposite sides of lines perpendicular to such rod and passing through the pivotal centers 17 and 20 of the abutments 15 and the lever arm 21, respectively. It should be here noted the center of curvature of the rounded bearing end of the rod is equivalent to a knife edge or point bearing, being the point which does not change its location with respect to the adjacent engaged member in consequence of a swinging movement of the rod. Consequently the term "engaging point" or "bearing point" may be used to include both a point or line bearing, and the center of curvature of the rounded bearing, of the rod, in this specification. Similar conditions obtain with respect to the lever 27, lever 33, link 31 and link 25. The lever 27 turns through equal angles to either side of a line $a—a$ drawn through its axis of oscillation, and lever 33 correspondingly turns through equal angles to either side of a line $b—b$ drawn through its axis. These lines $a—a$ and $b—b$ are parallel to one another and represent respectively the middle position of the lever 27 and the middle position of the lever 33. The pivots 28 and 34 are so placed and the link 31 is of such length that when such levers are in this position the link 31 is perpendicular to lines $a—a$ and $b—b$. By this construction and arrangement I secure the maximum possible accuracy in an instrument where the multiplying mechanism consists of levers, and I secure such great accuracy that no error can be detected even by the most delicate instruments of precision.

The instrument may be altered as to the multiplication of its reading by shifting the thrust rod 22 from one of the sockets 52 and notches 53 to the other. One of the notches 53 is twice as far from the fulcrum 20 as the other, whereby shifting the rod from the first notch to the second doubles the multiplication of movement of the index. The bottoms of both notches 53 are on the same line extending from the center of the stud 20 perpendicular to the rod 22 when the lever arm 21 is in its mid-position.

An additional feature applicable to the instrument above described is shown in Fig. 9, where 11 and 15 represent the same calipering or measuring abutments herein before described and 54, 55, and 56, 57 represent additional pairs of complemental caliper abutments, one member of each said additional pairs being secured to or carried by the same lever 16, which carries the abutment 15. The complemental abutments are all fixed in the arm 2ª of the instrument frame. The abutments 57, 55, and 15 are at progressively diminishing distances from the complemental abutments 56, 54, and 11, respectively, whereby each pair of complemental abutments may be used in succession for measuring a dimension of the work which is being reduced. Thus the instrument may be used for measuring work which is much larger than the required final size without requiring the caliper abutments to have an excessive range of movement, or requiring the graduations of the scale to be too fine, or requiring any adjustment of the abutment complemental to the one which actuates the index. Fig. 9 also shows a modification in the multiplying linkage, although it is to be understood that such modification is not of necessity used with the plurality of abutments corresponding to 54, 55, and 56, 57, for such abutments may be as well used with an instrument having a linkage mechanism shown in Fig. 1. The difference in the multiplying transmission linkage shown in Fig. 9, consists in this, that the movement is transmitted directly from the lever 19 to lever 58, which carries the index arm 8, by means of a link 59 which is pivotally joined to the end of the lever 19 and to the point 60 of the lever 58. Link 59 consists of a rod which is oppositely threaded at its ends, which ends are screwed into bearing blocks 60 and 61 contained in sockets in the levers 58 and 19, respectively, such blocks being preferably cylindrical and arranged with their axes parallel to the axes of the levers. Conveniently by rotating the rod 59 the position of the index may be adjusted with respect to the caliper adjustments.

Wherever I have used the terms "vertical" and "horizontal" or "upper" and "lower", or "top" and "bottom", I have done so with reference to the position of the instrument shown in the drawings, not intending thereby to imply any limitation in the construction or arrangement of the parts or mode of use of the instrument.

The caliper made according to my invention is uniform in its action, because the movement of the measuring abutment is resisted by a long and flexible spring of uniform power, wherefore the accuracy of readings taken does not depend on the delicacy of touch of the workman. The instrument shows the reading instantly without necessity of adjustment or manipulation of any part, whereby it may be used to secure measurements with great rapidity. The principles of its construction, as hereinbefore described, secure great accuracy in results.

What I claim and desire to secure by Letters Patent is:

1. A micrometer caliper comprising a frame, a caliper abutment pivotally mounted on said frame, an indicator, and transmission mechanism between said abutment and said indicator constructed to multiply the movement transmitted, including a lever mounted on an axis parallel with the pivot axis of the abutment and a thrust rod between the abutment and said lever, the pivot of said abutment being located at so great a distance from the operating face of said abutment as to cause the movement permitted to such face to occur in a substantially straight line, and the ends of the thrust rod being engaged with the abutment and lever at points forming two adjacent angles of a rectangle of which the opposite sides pass through the pivot axes of said abutment and lever, respectively, when in their mid positions.

2. A micrometer caliper comprising a body, a measuring abutment, a fixed abutment, a lever pivoted to said body carrying said measuring abutment, a motion-multiplying lever pivoted adjacent to said abutment, the pivotal axis of said levers being parallel, an index operated by said multiplying lever, and a thrust rod interposed between and in engagement with said measuring abutment and said multiplying lever, the pivots of said levers being in planes perpendicular to the line between the fixed and measuring abutments and separated by a distance equal to the length of said thrust rod.

3. A micrometer caliper comprising a body, a measuring abutment, a lever pivoted to said body carrying said abutment, a motion-multiplying lever pivoted adjacent to said abutment, an index operated by said multiplying lever, and a thrust rod interposed between and in engagement with said abutment and said multiplying lever, the pivots of said levers being so disposed with respect to said thrust rod that such rod is approximately perpendicular to lines drawn respectively from the pivot of the abutment-carrying lever to the engaging point of the rod with the abutment, and from the pivot of the multiplying lever to the engaging point of the rod with said lever.

4. A micrometer caliper comprising a body, a measuring abutment, a lever pivoted to said body carrying said abutment, a motion-multiplying lever pivoted adjacent to said abutment, an index operated by said multiplying lever, and a thrust rod interposed between and in engagement with said abutment and said multiplying lever, the pivots of said levers being so disposed with respect to said thrust rod that when the abutment, rod, and multiplying lever are in the middle points of their permitted ranges of movement, the line joining the engaging points of the rod with the abutment and lever is perpendicular to lines joining said engaging points with the pivotal axis of the abutment and pivotal axis of the multiplying lever, respectively.

5. In a micrometer caliper, a measuring abutment pivotally mounted to swing on an arc of such long radius that the divergence of the movement of the abutment within the range of movement permitted, from a straight line is inappreciable, a multiplying lever having a short arm and a long arm and pivotally located at such a point that its short arm is adjacent to said abutment, said abutment and short lever arm having bearing points at different distances from the fulcrum of the lever, a transmission member adapted to be engaged with either set of bearing points of the abutment and lever whereby to alter the multiplication of movement transmitted to the indicator, and a distance indicator connected for operation by the long arm of said lever.

6. A micrometer caliper comprising a frame, a stationary abutment carried by said frame, a complemental abutment mounted on said frame and movable toward and away from said stationary abutment, a lever having a short arm and a long arm pivoted to said frame, a transmission member extending between and having a bearing on said movable abutment and the short arm of said lever respectively, a second lever having a long arm and a short arm, transmission means between the long arm of the first lever and the short arm of the second lever, and a distance indicator operated by the long arm of the second lever, the said abutment and the short arm of the first lever having a plurality of bearing points at different distances from the fulcrum of said lever, each adapted to receive and hold said transmission member, whereby the multiplication of movement transmitted thereby may be varied.

7. A micrometer caliper comprising a frame, a stationary abutment carried by said frame, a complemental abutment mounted on said frame and movable toward and away from said stationary abutment, a lever having a short arm and a long arm pivoted to said frame, a transmission member extending between and having a bearing on said movable abutment and the short arm of said lever respectively, a second lever having a long arm and a short arm, transmission means between the long arm of the first lever and the short arm of the second lever, and a distance indicator operated by the long arm of the second lever, said levers being so arranged that the short arms of both are parallel to one another when at the middle point of their permitted ranges of movement.

8. A micrometer measuring instrument comprising a frame, an abutment mounted movably upon said frame adapted to engage the article to be measured, a motion-multiplying lever having a short arm arranged to extend approximately perpendicular to the direction of movement of said abutment, a transmission member between and engaged with said abutment and the short arm of said lever so located that the line between its points of engagement with the lever and abutment is approximately perpendicular to the said lever arm, said lever having also a long arm, a second lever having long and short arms, an indicator connected for operation by the long arm of said second lever, an intermediate lever, a link connecting the said intermediate lever with the long arm of the first named lever, and a second link connecting the intermediate lever with the short arm of the second named lever, the said levers being so arranged that when in their middle position the short arm of the second lever is parallel to the arm of the intermediate lever with which said second named link is connected.

9. A micrometer measuring instrument comprising a frame, an abutment mounted movably upon said frame adapted to engage the article to be measured, a motion-multiplying lever having a short arm arranged to extend approximately perpendicular to the direction of movement of said abutment, a transmission member between and engaged with said abutment and the short arm of said lever so located that the line between its points of engagement with the lever and abutment is approximately perpendicular to the said lever arm, said lever having also a long arm, a second lever having long and short arms, an indicator connected for operation by the long arm of said second lever, an intermediate lever, a link connecting the said intermediate lever with the long arm of the first named lever, and a second link connecting the intermediate lever with the short arm of the second named lever, the said levers being so arranged that when in their middle position the short arm of the second lever is parallel to the arm of the intermediate lever with which said second named link is connected, and both said arms are perpendicular to the said second named link.

10. In a micrometer caliper in combination with a movable measuring abutment and a distance indicator, a motion-multiplying mechanism between said abutment and said indicator comprising a lever having a long arm with which said indicator is connected and having a short arm, a link joined to the short arm of said lever, a second lever joined to said link, said levers being arranged so as to swing equal distances to opposite sides of a mid-position in which the said link is perpendicular to the arms of both levers with which it is connected, and a third lever having a long arm connected with the second named lever and having a short arm arranged adjacent to the measuring abutment in position to be moved when the abutment is moved.

11. In a micrometer caliper in combination with a movable measuring abutment and a distance indicator, a motion-multiplying mechanism between said abutment and said indicator comprising a lever having a long arm with which said indicator is connected and having a short arm, a link joined to the short arm of said lever, a second lever joined to said link, said levers being arranged as to swing equal distances to opposite sides of a mid-position in which the said link is perpendicular to the arms of both levers with which it is connected, a third lever having a long arm and a short arm, a link connected with the second lever and with the long arm of the third named lever and being arranged approximately parallel to the first named link, and said third lever being arranged with its short arm adjacent to the abutment and extending perpendicularly to the line of movement of the abutment, and a transmission member interposed between the abutment and said short arm.

12. A micrometer caliper comprising a frame having separated arms, measuring abutments extending their respective arms toward one another, one of said abutments being movable toward and from the other and being pivotally connected to the frame at such a distance from the line of its movement that the arc through which it swings is substantially coincident at all points with a straight line tangent to such arc, a multiplying lever pivoted on an axis parallel to that of the abutment near the abutment and having a short arm extending across the prolongation of the line in which the acting face of the abutment is permitted to move and being approximately perpendicular to said line, a thrust rod engaged with the abutment at a point close to the acting face thereof and also engaged with said short lever arm, said points of engagement being in the line of movement of the abutment and also in lines perpendicular to said line of movement which pass through the pivots of the movable abutment and of the multiplying lever respectively, and said lever having a long arm, and an indicator operated by the long arm of said lever.

13. A micrometer caliper comprising a frame having separated arms, measuring abutments extending their respective arms toward one another, one of said abutments being movable toward and from the other and being pivotally connected to the frame at such a distance from the line of its movement that the arc through which it swings is substantially coincident at all times with a straight line tangent to such arc, a multiplying lever pivoted on an axis parallel to that of the abutment near the abutment and having a short arm extending across the prolongation of the line in which the acting face of the abutment is permitted to move and being approximately perpendicular to said line, a thrust rod engaged with the abutment at a point close to the acting face thereof and also engaged with said short lever arm, said points of engagement being in the line of movement of the abutment, and said lever having a long arm, and an indicator operated by the long arm of said lever, and a stop mounted in the frame at the side of the long arm of said lever from which said lever is moved by the normal displacements of the abutment, said stop being adjustable in the plane of displacement of said arm to limit the return of the arm from displaced position.

In testimony whereof I have affixed my signature, in presence of two witnesses.

JOHN BATH.

Witnesses:
HUBERT S. PARK,
ARTHUR S. WASHBURN.